US012750276B2

(12) United States Patent
Genis et al.

(10) Patent No.: US 12,750,276 B2
(45) Date of Patent: Sep. 29, 2026

(54) TECHNIQUES FOR CLOUD MIGRATION UTILIZING INFRASTRUCTURE AS CODE

(71) Applicant: Go Firefly Ltd., Tel Aviv (IL)

(72) Inventors: Sefi Genis, Ramat Gan (IL); Eran Bibi, Nes Tziona (IL)

(73) Assignee: Go Firefly Ltd., Tel Aviv (IL)

( * ) Notice: Subject to any disclaimer, the term of this patent is extended or adjusted under 35 U.S.C. 154(b) by 50 days.

(21) Appl. No.: 18/816,808

(22) Filed: Aug. 27, 2024

(65) Prior Publication Data

US 2026/0067156 A1 Mar. 5, 2026

(51) Int. Cl.
*H04L 41/0806* (2022.01)
*G06F 8/30* (2018.01)
*H04L 41/0816* (2022.01)

(52) U.S. Cl.
CPC ............ *H04L 41/0806* (2013.01); *G06F 8/30* (2013.01); *H04L 41/0816* (2013.01)

(58) Field of Classification Search
CPC .... H04L 41/0806; H04L 41/0816; G06F 8/30
See application file for complete search history.

(56) References Cited

U.S. PATENT DOCUMENTS 9,092,837 B2 * 7/2015 Bala ........................ G06F 9/461
10,360,025 B2 * 7/2019 Foskett ..................... G06F 8/71
10,872,029 B1 * 12/2020 Bawcom .................. G06F 8/60
10,884,732 B1 * 1/2021 Zolotow .................. G06F 8/76
10,990,370 B1 * 4/2021 Bawcom ................... G06F 8/35
10,999,163 B2 * 5/2021 Abraham .............. G06F 9/5072
11,010,191 B1 * 5/2021 Hornbeck ............. H04L 67/133
11,074,165 B2 * 7/2021 Khakare ............. G06F 11/3684
11,669,308 B2 * 6/2023 Fletcher ............... G06F 11/324 717/106
11,818,156 B1 * 11/2023 Parikh ................. G06F 16/9537
11,962,601 B1 * 4/2024 Srinivasan .......... H04L 63/1433
12,028,224 B1 * 7/2024 Kwatra ................. H04L 41/084
12,483,576 B1 * 11/2025 Guo ........................ H04L 43/06
12,489,771 B1 * 12/2025 Erlingsson ............ H04L 67/535
12,489,781 B2 * 12/2025 Heller ................. H04L 63/1441
2014/0146055 A1 * 5/2014 Bala .......................... G06F 8/63 345/501
2020/0278920 A1 * 9/2020 Khakare ................... G06F 8/61
2021/0365247 A1 * 11/2021 Fletcher ................ G06F 9/5072
2022/0012239 A1 * 1/2022 Colcord .................. G06F 21/54
2022/0200869 A1 * 6/2022 Erlingsson .............. H04L 67/10
2023/0075183 A1 * 3/2023 Copty ........................ G06F 8/51
2023/0164174 A1 * 5/2023 Heller ................. H04L 63/1441 726/23

(Continued)

*Primary Examiner* — Jimmy H Tran
(74) *Attorney, Agent, or Firm* — M&B IP Analysts, LLC

(57) ABSTRACT

A system and method for cloud migration including deploying a plurality of resources in a cloud computing environment, is presented. The method includes accessing a plurality of code objects located in a code repository; generating a declaration code for an Infrastructure as Code (IaC) platform based on code objects, wherein the code objects are integrated into the declaration code and located in a IaC configuration file; and initiating network discovery to detect a plurality of resources in a cloud computing environment wherein each resource is deployed in the cloud computing environment based on the code objects of the declaration code located in the IaC configuration file.

17 Claims, 6 Drawing Sheets

(56) References Cited

U.S. PATENT DOCUMENTS

| | | | | |
|---|---|---|---|---|
| 2023/0275917 | A1* | 8/2023 | Karmali | G06F 16/9537 709/224 |
| 2023/0385032 | A1* | 11/2023 | Fletcher | G06F 11/3428 |
| 2024/0027999 | A1* | 1/2024 | Grevers, Jr. | G05B 19/4185 |
| 2024/0291846 | A1* | 8/2024 | Saraf | H04L 63/0876 |
| 2024/0314154 | A1* | 9/2024 | Shua | H04L 63/1425 |
| 2024/0362559 | A1* | 10/2024 | Lahiri | G06Q 10/06315 |
| 2024/0370305 | A1* | 11/2024 | Saraf | G06F 9/5072 |
| 2025/0016190 | A1* | 1/2025 | Rawat | H04L 41/22 |
| 2025/0030712 | A1* | 1/2025 | Saraf | H04L 63/1425 |
| 2025/0030722 | A1* | 1/2025 | Ragula | H04L 63/102 |
| 2025/0055869 | A1* | 2/2025 | Barel | H04L 63/1433 |
| 2025/0094258 | A1* | 3/2025 | Findlay | G06F 9/5072 |
| 2025/0106097 | A1* | 3/2025 | Shinde | H04L 41/0681 |
| 2025/0106307 | A1* | 3/2025 | Wang | G06F 3/0482 |
| 2025/0130910 | A1* | 4/2025 | Meyuhas | G06F 11/3409 |
| 2025/0133120 | A1* | 4/2025 | Valek | H04L 63/1433 |
| 2025/0159024 | A1* | 5/2025 | Assayag | H04L 63/0236 |
| 2025/0193249 | A1* | 6/2025 | Patnala | H04L 63/1425 |
| 2025/0208936 | A1* | 6/2025 | Danino | G06F 11/008 |
| 2025/0225253 | A1* | 7/2025 | Godefroid | G06F 21/577 |
| 2025/0265336 | A1* | 8/2025 | McKey | G06F 21/57 |
| 2025/0298905 | A1* | 9/2025 | Godefroid | G06F 21/552 |
| 2025/0306740 | A1* | 10/2025 | Xie | G06F 3/04817 |

* cited by examiner

400

410

420

430

```
resource "aws_instance" "webapp-98d" {
  ami                          = "ami-02cad064a29d4550c"
  associate_public_ip_address  = true
  availability_zone            = "eu-west-1b"
  cpu_core_count               = 1
  cpu_threads_per_core         = 1
  credit_specification {
    cpu_credits = "standard"
  }
  disable_api_termination = false
  ebs_optimized           = false
  enclave_options {
    enabled = false
  }
  hibernation                          = false
  instance_initiated_shutdown_behavior = "stop"
  instance_type                        = "t2.micro"
  metadata_options {
    http_put_response_hop_limit = 2
    http_tokens                 = "required"
  }
```

FIGURE 4

TECHNIQUES FOR CLOUD MIGRATION UTILIZING INFRASTRUCTURE AS CODE

TECHNICAL FIELD

The present disclosure relates generally to the field of cloud migration, and more specifically to deploying resources based on declaration code in a cloud computing environment.

BACKGROUND

Cloud migration involves moving an organization's digital assets, services, databases, IT resources, and applications into the cloud. This process typically includes shifting data and applications from on-premises infrastructure to a cloud-based environment, which can offer benefits like scalability, cost efficiency, and improved performance.

One significant challenge in successfully completing a cloud migration is ensuring data integrity and security during the transition. As data is transferred, there's a risk of data loss, corruption, or exposure to unauthorized access. Ensuring that data remains intact and secure requires careful planning, robust encryption methods, and comprehensive testing before, during, and after the migration process. Any lapses in these areas can lead to data breaches, operational disruptions, and loss of trust from customers and stakeholders.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include accessing a plurality of code objects located in a code repository. Method may also include generating a declaration code for an Infrastructure as Code (IaC) platform based on code objects, where the code objects are integrated into the declaration code and located in an IaC configuration file. Method may furthermore include initiating network discovery to detect a plurality of resources in a cloud computing environment where each resource is deployed in the cloud computing environment based on the code objects of the declaration code located in the IaC configuration file. Other embodiments of this aspect include corresponding computer systems, apparatus, and computer programs recorded on one or more computer storage devices, each configured to perform the actions of the methods.

Implementations may include one or more of the following features. Method may include: accessing a primary cloud computing environment to detect resources deployed therein; extracting configuration data from each resource; generating a code object of the plurality of code objects based on the extracted configuration data; and generating a declaration code based at least on the generated code object. Method may include: detecting the plurality of resources in the cloud computing environment; and generating an instruction to deprovision a corresponding resource in the primary cloud computing environment. Method may include: sending a request to provision deployed resources in a cloud computing environment to an orchestrator, where the orchestrator is configured to provision the deployed resources in a cloud computing environment. Method may include: generating a deployment plan of a plurality of resources in the cloud computing environment including a single or a plurality of duplicate resources, where the duplicate resource is identical in any one of: configuration, function, type, location, and any combination thereof, to another resource in another cloud computing environment. Method may include: sending the generated declaration code integrated with the code objects to a code repository. Method may include: generating in a first code object an identifier of a specific resource to be deployed in a cloud computing environment. Method may include: defining the code objects to include any one of: a type of resource, a configuration of a resource, a function of a resource, a location of a resource, and any combination thereof. Implementations of the described techniques may include hardware, a method or process, or a computer tangible medium.

In one general aspect, non-transitory computer-readable medium may include one or more instructions that, when executed by one or more processors of a device, cause the device to: access a plurality of code objects located in a code repository, generate a declaration code for an Infrastructure as Code (IaC) platform based on code objects, where the code objects are integrated into the declaration code and located in an IaC configuration file, and initiate network discovery to detect a plurality of resources in a cloud computing environment where each resource is deployed in the cloud computing environment based on the code objects of the declaration code located in the IaC configuration file. Other embodiments of this aspect include corresponding computer systems, apparatus, and computer programs recorded on one or more computer storage devices, each configured to perform the actions of the methods.

In one general aspect, system may include one or more processors configured to: access a plurality of code objects located in a code repository. System may furthermore generate a declaration code for an Infrastructure as Code (IaC) platform based on code objects, where the code objects are integrated into the declaration code and located in an IaC configuration file. System may in addition initiate network discovery to detect a plurality of resources in a cloud computing environment where each resource is deployed in the cloud computing environment based on the code objects of the declaration code located in the IaC configuration file. Other embodiments of this aspect corresponding computer systems, apparatus, and computer programs recorded on one or more computer storage devices, each configured to perform the actions of the methods.

Implementations may include one or more of the following features. System where the one or more processors are further configured to: access a primary cloud computing environment to detect resources deployed therein; extract configuration data from each resource; generate a code object of the plurality of code objects based on the extracted configuration data; and generate a declaration code based at least on the generated code object. System where the one or more processors are further configured to: detect the plurality of resources in the cloud computing environment; and generate an instruction to deprovision a corresponding resource in the primary cloud computing environment. System where the one or more processors are further configured to: send a request to provision deployed resources in a cloud computing environment to an orchestrator, where the orchestrator is configured to provision the deployed resources in a cloud computing environment. System where the one or more processors are further configured to: generate a deployment plan of a plurality of resources in the cloud computing environment including a single or a plurality of duplicate resources, where the duplicate resource is identical in any one of: configuration, function, type, location, and any combination thereof, to another resource in another cloud compute environment. System where the one or more processors are further configured to: send the generated declaration code integrated with the code objects to a code repository. System where the one or more processors are further configured to: generate in a first code object an identifier of a specific resource to be deployed in a cloud computing environment. System where the one or more processors are further configured to: define the code objects to include any one of: a type of resource, a configuration of a resource, a function of a resource, a location of a resource, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 4 is an example illustration of a code object generated by the codifier, implemented in accordance with an embodiment.

DETAILED DESCRIPTION

The various disclosed embodiments include methods and systems for generate code objects based on detected configuration properties of deployed cloud resources in a cloud infrastructure. According to the disclosed embodiments, a code object is generated based on the detected configuration information of a unique resource deployed in a cloud computing environment.

Figure 1:
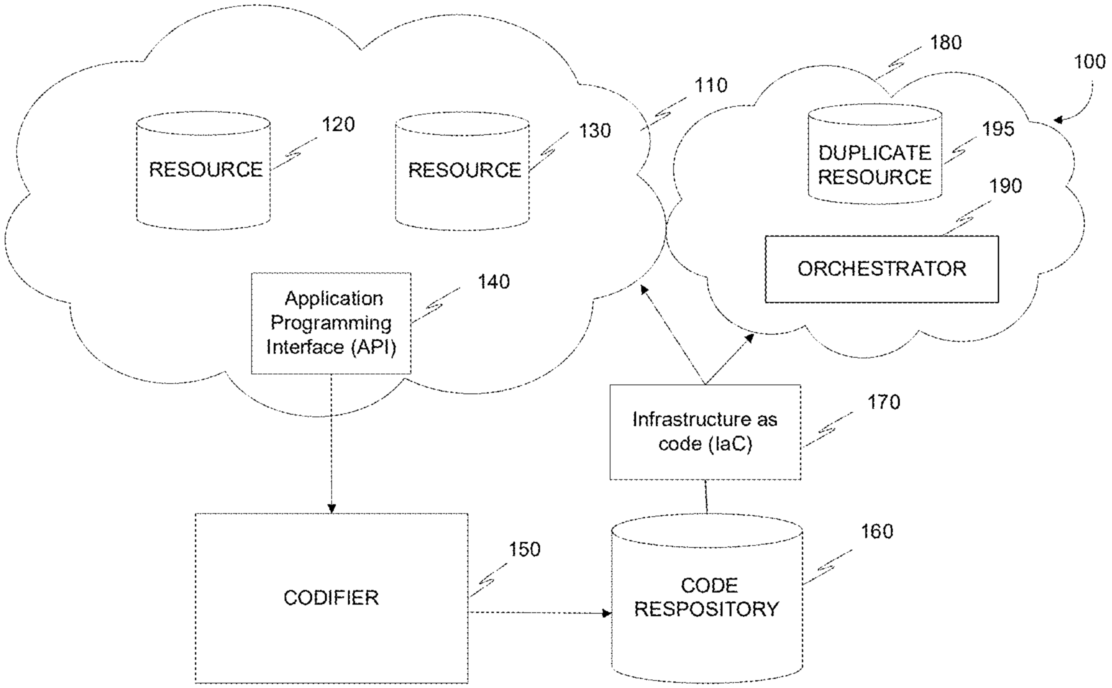
FIG. 1 is an example schematic diagram of a codifier in a cloud computing environment, implemented in accordance with an embodiment.

FIG. 1 is an example schematic diagram 100 of a codifier in a cloud computing environment, implemented in accordance with an embodiment. In an embodiment, the first cloud computing environment 110, includes a plurality of resources, such as a first resource 120, a second resource 130, and an Application Programming Interface (API) 140. In an embodiment, the first cloud computing environment 110 is communicative with a codifier 150, and an Infrastructure as Code (IaC) 170. In an embodiment, the codifier 150 is communicatively coupled with a code repository 160 and a second cloud computing environment 180. The second cloud computing environment 180 includes an orchestrator 190 and a single or a plurality of resources (e.g. a duplicate resource 195), in some embodiments.

In an embodiment, the first cloud computing environment 110 includes a virtual private cloud (VPC), Virtual Network (VNet), virtual private network (VPN) and the like. A cloud computing platform is implemented on a cloud computing infrastructure, for example, such as Amazon® Web Services (AWS), Google Cloud Platform® (GCP), Microsoft® Azure, and the like.

In an embodiment, the first cloud computing environment 110 includes a plurality of cloud entities deployed therein. According to an embodiment, a cloud entity is, for example, a principal, a resource, and the like. In an embodiment, a plurality of resources, such as a first resource 120, a second resource 130, a combination thereof, and the like, is deployed in the first cloud computing environment 110. In some embodiments, a first resource 120 and a second resource 130 are cloud entities that provide access to a compute resource, such as a processor, a memory, storage, and the like.

In some embodiments, a first resource 120 and a second resource 130, are virtual machines, software containers, serverless functions, and the like. According to certain embodiments, a first resource 120 and a second resource 130, include a software application deployed thereon, such as a webserver, a gateway, a load balancer, a web application firewall (WAF), an appliance, various combinations thereof, and the like.

In an embodiment, a cloud entity is a principal relative to another cloud entity and a first resource 120 to other cloud entities. In an embodiment, a cloud entity is a principal relative to another cloud entity and a second resource 130, to other cloud entities. For example, a load balancer is a first resource 120 to a user account requesting a webpage from a webserver behind the load balancer, and the load balancer is a principal to the webserver. In some embodiments, a first resource 120 and a second resource 130 are configured to communicate with each other via an internal bus, data bus, Local Area Network (LAN), inter-process communication (IPC), and the like.

In some embodiments, the first cloud computing environment 110 includes an Application Programming Interface (API) 140. In an embodiment, the API 140 is configured to enable two software components to communicate with each other using a set of definitions and protocols. In certain embodiments, the API 140 is utilized to access a first resource 120, a second resource 130, etc., of the first cloud computing environment 110. For example, in an embodiment, a first resource 120 is configured to generate an API call. In an embodiment, a process deployed on a virtual machine initiates an API call, for example to the API 140.

In an embodiment, the codifier 150 is configured to generate code objects. In some embodiments, the codifier 150 is configured to generate code objects based on configuration properties of detected resources. In an embodiment, the codifier 150 is configured to send requests, instructions, a combination thereof, and the like to the API 140 in a software language. For example, in an embodiment, the codifier 150 is configured to send a request to the API 140 requesting configuration information on deployed resources in the first cloud computing environment 110.

In certain embodiments, the API 140 is configured to convert the requests, commands, instructions, etc., from the codifier 150 into an internalized cloud system request. In various embodiments, the API 140 is configured to generate and return responses to the codifier's 150 requests, instructions, etc.

For example, in an embodiment, the API 140 is configured to send information on resources deployed in the first cloud computing environment 110 to the codifier 150 in response to the codifier 150 requesting information on the resources. For example, in an embodiment, the API 140 is configured to send information pertaining to deployed resources in the cloud computing environment, such as: resource identification, data source, Infrastructure as Code (IaC) status, a location of the resource, properties of the resource, tags of the resource, a timestamp, a combination thereof, and the like.

In some embodiments, the codifier 150 is configured to generate a code object, for example utilizing a language model. In an embodiment, the codifier 150 is configured to generate a prompt for a language model utilizing retrieved information from the API 140, a prompt template, a combination thereof, and the like, to generate a prompt for generating a code object.

In various embodiments, the codifier 150 is configured to provide the generated prompt to a single language model, a plurality of language models, and the like. In some embodiments, the language model is a large language model (LLM), small language model (SLM), and the like.

In an embodiment, the language model is configured to output a codifying prompt based on the input prompt from the codifier 150. In some embodiments, the codifier 150 is configured to feed the specific prompt to a single language model, a plurality of language models, etc., to generate a response. In an embodiment, the codifier 150 is configured to utilize data of the generated response from the language model to generate a code object.

In various embodiments, the code object is based on configuration properties of a deployed resource, a plurality of deployed resources, etc., in the first cloud computing environment 110.

In an embodiment, a code repository 160 includes a version control systems (VCS) repository that stores metadata for a set of files and stores the history of changes made to those files. For example, in an embodiment, the VCS is deployed utilizing Github®. In some embodiments, the code repository 160 is configured to store any one of: code objects, declaration code, IaC configuration files, Terraform® configuration file, a combination thereof and the like. In certain embodiments, the code repository 160 is a cloud database which is deployed to run in a public or hybrid cloud environment and is managed by database-as-a-service (DBaaS) or deployed in a cloud-based virtual machine (VM).

According to some embodiments, the VCS includes code objects of an IaC platform, such as IaC platform 170. In an embodiment, an IaC code object is, for example, a Terraform® code object.

An IaC platform 170 is configured to eliminate the need to manually configure and manage cloud resources, by defining the desired state of cloud resources using code, in various embodiments. Such code (e.g. declaration code) is typically written in a declarative language, allowing to specify the desired configuration and relationships between various resources, in an embodiment. In some embodiments, IaC code is version-controlled, shared, and collaborated on using code repository tools.

In some embodiments, the IaC platform 170 is configured to define and manage infrastructure resources across different cloud providers using code, offering a unified approach to infrastructure management in multi-cloud or hybrid cloud environments. Some examples of an IaC platform 170 used in the cloud computing industry include Terraform®, AWS® CloudFormation, Azure® Resource Manager, and Google® Cloud Deployment Manager. In various embodiments, an IaC platform 170 is configured to retrieve code objects from the code repository 160 and deploy them as instances in a second cloud computing environment 180.

In an embodiment, a second cloud computing environment 180 is implemented as a virtual private cloud (VPC), Virtual Network (VNet), virtual private network (VPN) and the like. A second cloud computing environment 180 is implemented on a cloud computing infrastructure, for example, such as Amazon® Web Services (AWS), Google Cloud Platform® (GCP), Microsoft® Azure, and the like.

According to an embodiment, a second cloud computing environment 180 is implemented on the same cloud computing infrastructure as the first cloud computing environment 110. In an embodiment, the second cloud computing environment 180 is implemented on a second cloud computing infrastructure (e.g., AWS) and the first cloud computing environment is implemented on a first cloud computing infrastructure (e.g., Azure).

In some embodiments, the second cloud computing environment 180 includes the same VPC, the same VPN, the same VNet, a combination thereof, and the like, as the first cloud computing environment 110. In an embodiment, the second cloud computing environment 180 and the first cloud computing environment 110 each have a unique VPC, a unique VPN, a unique VNet, a combination thereof, and the like.

In an embodiment, the codifier 150 is configured to deploy a resource, a plurality of resources, etc. in a second cloud computing environment 180. In some embodiments, the codifier 150 is configured to access code objects stored in the code repository 160. In various embodiments, the codifier 150 is configured to integrate the code objects with declaration code and incorporate them into a Terraform® configuration file, an IaC configuration file, a combination thereof, and the like.

In various embodiments, such files (e.g., Terraform® configuration file, IaC configuration file, etc.) define the desired state and infrastructure of another cloud computing environment (e.g., second cloud computing environment 180) that is to be deployed.

Furthermore, such files (e.g., Terraform® configuration file, IaC configuration file) define resources that are to be deployed in another cloud computing environment (e.g. second cloud computing environment 180). In certain embodiments, code objects of the IaC configuration file provide data that defines resources, resource types, resource functions, resource locations, a combination thereof, and the like. In various embodiments, the codifier 150 is configured to trigger the deployment of a single resource, a plurality of resources, etc., in a second cloud computing environment 180.

In an embodiment, the codifier 150 is configured to trigger the deployment of a duplicate resource 195 of a plurality of resources in the second cloud computing environment 180. In certain embodiments, a duplicate resource 195 is identical in configuration to a resource located in the first cloud computing environment 110. In an embodiment, the duplicate resource 195 has an: identical resource type, identical resource function, identical resource deployment location, identical configuration, a combination thereof, and the like, to a resource located in the first cloud computing environment 110.

In various embodiments, the codifier 150 is configured to send a request to the orchestrator 190 to provision the deployed resources. In various embodiments, the orchestrator 190 is configured to provision the deployed resources (e.g. duplicate resource 195) in the second cloud computing environment 180 by allocating any one of: a virtual machine, storage, networks, processor, memory, virtual resource, physical resource, a combination thereof, and the like.

Figure 2:
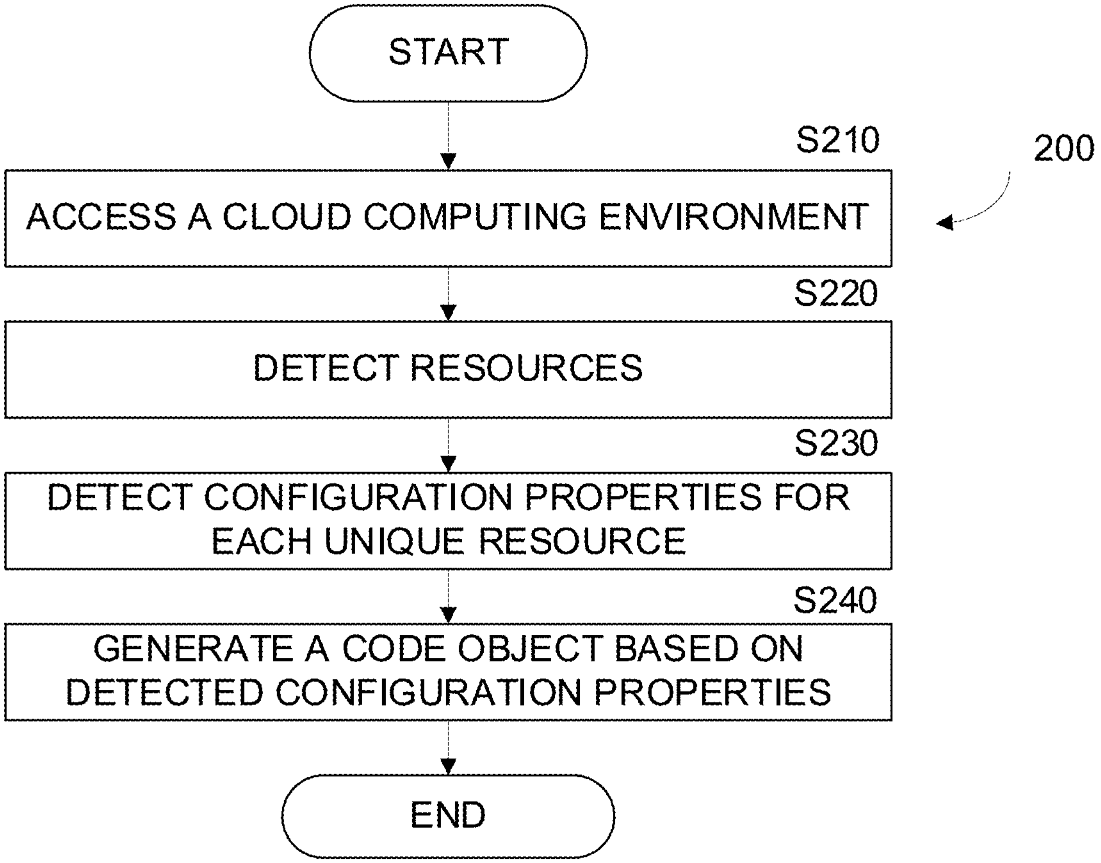
FIG. 2 is an example flowchart illustrating a method for generating a code object, according to an embodiment.

FIG. 2 is an example flowchart 200 illustrating a method for generating a code object, according to an embodiment.

At S210, a cloud computing environment is accessed. In an embodiment, a codifier (FIG. 1, 150) accesses a first cloud computing environment (FIG. 1, 110) including information about resources and configuration properties through an API (FIG. 1, 140). The codifier (FIG. 1, 150) is configured to obtain access to the first cloud computing environment (FIG. 1, 110) by sending requests (e.g. commands, instructions, etc.) to the API (FIG. 1, 140) seeking information about resources deployed in the first cloud computing environment (FIG. 1,110).

At S220, resources are detected. In various embodiments, resources deployed in the first cloud computing environment (FIG. 1, 110) such as a first resource (FIG. 1,120) and a second resource (FIG. 1,130) are detected. The codifier (FIG. 1, 150) is configured to detect resources from the first cloud computing environment (FIG. 1,110) by communicating with the API (FIG. 1,140), according to an embodiment.

In an embodiment, the codifier (FIG. 1, 150) is configured to send requests (e.g. commands, instructions, etc.) to the API (FIG. 1,140) seeking the identification of resources deployed in the first cloud computing environment (FIG. 1, 110). In certain embodiments, the API (FIG. 1, 140) is configured to convert the requests from the codifier (FIG. 1, 150) into a software language.

In an embodiment, the codifier (FIG. 1, 150) is configured to generate requests seeking configuration properties of deployed resources in the cloud computing environment (FIG. 1, 110). In various embodiments, the API (FIG. 1, 140) is configured to generate a response to a request from the codifier (FIG. 1, 150) including the identifying of resources deployed in the first cloud computing environment (FIG. 1,110).

Further, in an embodiment, the API (FIG. 1, 140) is configured to generate responses to the codifier (FIG. 1, 150) identifying configuration properties of the deployed resources in the first cloud computing environment (FIG. 1, 110). In some embodiments, the codifier (FIG. 1, 150) is configured to collect, extract, parse, etc., data from the received responses from the API (FIG. 1, 140) and identify configuration parameters of resources detected in the first cloud computing environment (FIG. 1, 110).

At S230, configuration properties for each unique resource is detected. In some embodiments, where the codifier (FIG. 1, 150) detects resources in the first cloud computing environment (FIG. 1, 110), then the codifier (FIG. 1, 150) is configured to request configuration information (e.g. configuration properties) for a unique resource.

In various embodiments, a unique resource is a detected resource which has multiple instances deployed in the computing environment. For example, in an embodiment, an Amazon® auto-scaling group (ASG) includes a plurality of virtual machines, each virtual machine being an instance from a single image, code object, etc.

In certain embodiments, the API (FIG. 1, 140) is configured to send a response providing further data about the unique resource such as an identification of the resource, data source, IaC status, location of the resource, configuration properties, tags, timestamp, a combination thereof, and the like. In some embodiments, the codifier (FIG. 1,150) is configured to retrieve and parse the configuration information generated from the API (FIG. 1, 140) to detect configuration properties for each unique resource.

At S240, a code object is generated. In an embodiment, the code object is generated based on detected configuration properties. In some embodiments, the code object is generated based on detected configuration properties for each unique resource. In an embodiment, the codifier (FIG. 1,150) is configured to generate code objects.

In various embodiments, the codifier (FIG. 1, 150) is configured to utilize the retrieved configuration information, stored prompt templates, and the like to generate a generic prompt. In an embodiment, the generic prompt is a request, command, query, instruction, a combination thereof, and the like. In some embodiments, the generic prompt is provided to a language model to generate a specific prompt.

In certain embodiments, the specific prompt is a request, command, query, instruction, a combination thereof, and the like. The codifier (FIG. 1,150) is configured to provide the specific prompt to language model, in an embodiment. In certain embodiments, the language model is configured to generate a response to the specific prompt from the codifier (FIG. 1, 150).

In various embodiments, the codifier (FIG. 1, 150) is configured to retrieve the response from the language model and utilize the language model response to generate a code object. In some embodiments, the code object is generated based on the generic prompt, specific prompt, and configuration properties of resources deployed in the cloud computing environment (FIG. 1,110), a combination thereof, and the like.

In an embodiment, the code object includes configuration code of a specific IaC platform, such as Terraform®. In certain embodiments, the configuration code includes a plurality of code objects, each code object corresponding to a resource deployed in the computing environment accessed by the codifier.

Figure 3:
FIG. 3 is an example illustration of configuration properties of a detected resource, implemented in accordance with an embodiment.

FIG. 3 is an example illustration 300 of configuration properties of a detected resource, implemented in accordance with an embodiment.

In some embodiments, the codifier (FIG. 1, 150) is configured to send requests, instructions, and the like, to the API (FIG. 1, 140) of a computing environment in order to receive configuration information pertaining to deployed resources in the cloud computing environment (FIG. 1, 110).

In various embodiments, the API (FIG. 1, 140) is configured to receive requests for configuration information for a unique resource from a codifier (FIG. 1, 150). In an embodiment the API is configured to convert a received request into internalized cloud system requests. Furthermore, the API (FIG. 1, 140) is configured to generate a response to the codifier's request for configuration information, in certain embodiments.

For example, in an embodiment, the API (FIG. 1, 140) is configured to provide the codifier (FIG. 1, 150) with configuration data of a unique resource such as a unique identifier of the resource 310, data source of the resource 320, IaC status of the resource 330, location of the resource 340, configuration properties 350, tags 360, a creation date of the resource 370, a combination thereof, and the like.

In an embodiment, deployed resources in a cloud computing environment 110 are assigned a unique identifier 310 which is used to track and manage the resource. In some embodiments, the unique identifier 310 is a string that includes a unique combination of letters and numerals. Further, in an embodiment, the unique identifier 310 indicates the type of resource, the zone the resource is located in, the region the resource is located in, a combination thereof, and the like.

In an embodiment, resources in a cloud computing environment have a data source 320 that indicates the initial location where the resource originated. In other embodiments, the data source 320 is a service or tool provided by the cloud infrastructure provider. For example, in some embodiments, the data source 320 is Amazon® Web Services (AWS) Management Console, Azure® portal, Google® Cloud Console, Google® Cloud API, and the like.

In some embodiments, resources in cloud computing environments include an IaC status 330. In various embodiments, an IaC platform (FIG. 1, 170) is configured to define and manage cloud computing resources across different cloud providers using code. An IaC platform (FIG. 1, 170) offers a unified approach to infrastructure management in multi-cloud or hybrid cloud environments. Various embodiments, of the IaC platform (FIG. 1, 170) used in the cloud computing industry include Terraform®, AWS® CloudFormation, Azure® Resource Manager, and Google® Cloud Deployment Manager.

In certain embodiments, an IaC status 330 indicates whether a resource in the cloud computing environment (FIG. 1, 110) is actively managed or controlled by an IaC platform (FIG. 1,170).

In certain embodiments, the API (FIG. 1,140) is configured to indicate locations 340 of resources in a cloud computing environment which indicate the location at which the resource is deployed.

In various embodiments, resources in a cloud infrastructure have configuration properties 350. In some embodiments, configuration properties 350 define the structure of a deployment including the type and properties of the resources that are deployed in the cloud infrastructure. For example, in some embodiments, configuration properties 350 include any one of: an instance type, a key pair, a security group, user data, Identity and Access Management (IAM) role, an availability zone, any combination thereof, and the like.

In some embodiments, tags 360 are used to assign metadata to resources in the cloud infrastructure. In various embodiments, tags 360 are tools used to manage, identify, organize, search for, and filter resources in the cloud infrastructure.

In various embodiments, resources in a cloud infrastructure have a creation date 370 which indicates the date the resource was created. In certain embodiments, the creation date 370 is a timestamp that indicates the time the resource was created. In an embodiment, the creation date is a date of deployment of the resource, a date of creation of a code object from which the resource is deployed, and the like.

FIG. 4 is an example illustration of a code object 400 generated by the codifier, implemented in accordance with an embodiment.

Components of a cloud computing environment (FIG. 1, 110) are deployed, in an embodiment, utilizing an infrastructure as code platform, development tools, and the like, in a development (i.e., dev) environment, and deployed to a test environment where code is tested.

In various embodiments, a code object is a unit of code that can be deployed and run within a cloud infrastructure. The code object is generated by a codifier (FIG. 1, 150) based on configuration information of the deployed resources (e.g. unique resources) in the cloud infrastructure. For example, in an embodiment, code objects include configuration properties such as an internet protocol address 410, an availability zone 420, hibernation status 430, a combination thereof, and the like.

In an embodiment, the codifier (FIG. 1, 150) is configured to access the cloud computing environment (FIG. 1, 110) through the API (FIG. 1, 140). In some embodiments, the codifier (FIG. 1, 150) is configured to send requests, instructions, and the like, to the API (FIG. 1,140) to detect configuration information pertaining to resources deployed in the cloud computing environment (FIG. 1, 110).

In an embodiment, the API (FIG. 1, 140) is configured to generate configuration information. In some embodiments the codifier (FIG. 1, 150) is configured to send a response to the codifier (FIG. 1, 150) identifying resources and providing configuration information about unique resources deployed in the cloud infrastructure. In some embodiments, the codifier (FIG. 1, 150) is configured to collect, extract, parse, etc., the generated response from the API (FIG. 1,140).

In various embodiments, the codifier (FIG. 1, 150) is configured to utilize both the received configuration information response from the API (FIG. 1, 140) and a stored prompt template to generate a generic prompt.

In an embodiment, the generic prompt includes a request, command, query, instruction, a combination thereof, and the like. In some embodiments, the generic prompt is provided to an LLM to generate a specific prompt.

In certain embodiments, the specific prompt includes a request, command, query, instruction, a combination thereof, and the like. The codifier (FIG. 1, 150) is configured to provide the specific prompt to a language model, in an embodiment. In certain embodiments, the language model is configured to generate a response to the specific prompt from the codifier (FIG. 1, 150).

In various embodiments, the codifier (FIG. 1, 150) is configured to retrieve the response from the LLM and utilize the LLM response to generate a code object. In some embodiments, a code object is generated based on the generic prompt, specific prompt, configuration properties of unique resources deployed in the cloud computing environment (FIG. 1,110), a combination thereof, and the like.

Figure 5:
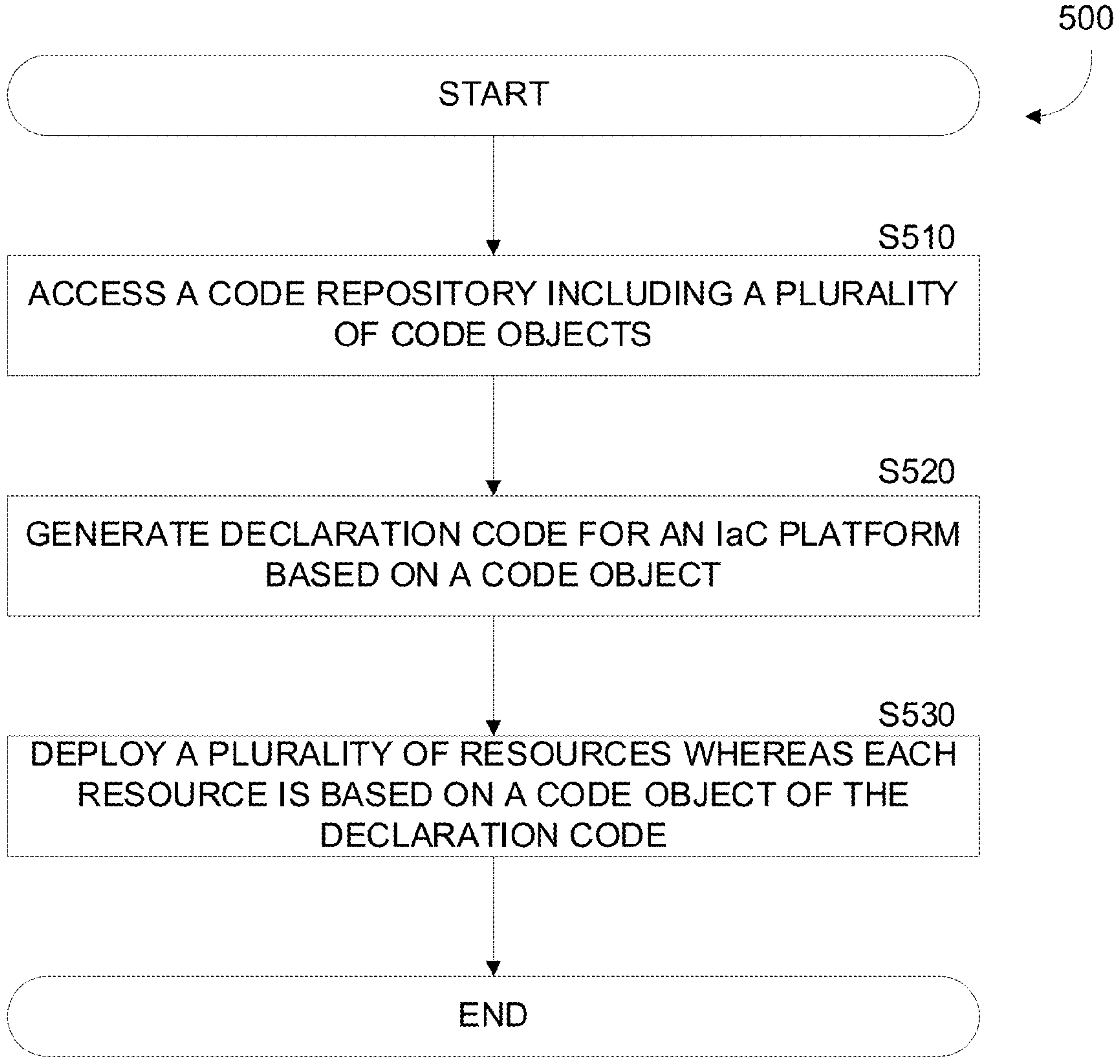
FIG. 5 in example flowchart for deploying resources based on declaratory code in a cloud computing environment, implemented in accordance with an embodiment.

FIG. 5 in example flowchart 500 for deploying resources based on declaratory code in a cloud computing environment, implemented in accordance with an embodiment.

At S510, a code repository is accessed. In an embodiment, the code repository (FIG. 1, 160) including a plurality of code objects is accessed. In certain embodiments, a codifier (FIG. 1, 150) is configured to access the code repository (FIG. 1, 160) including code objects generated by the codifier (FIG. 1, 150) located in the code repository (FIG. 1, 160).

At S520, a declaration code is generated. In some embodiments, the declaration code is generated for an IaC platform. In an embodiment, the declaration code for the IaC platform (FIG. 1, 170) is generated based on a code object, a plurality of code objects, etc. In an embodiment, the codifier (FIG. 1, 150) is configured to generate declaration code based on the accessed code objects retrieved from the code repository (FIG. 1, 160).

In an embodiment, code objects from the code repository (FIG. 1, 160) are integrated into declaration code in an IaC configuration file, Terraform® configuration file, etc., a combination thereof, and the like.

In various embodiments, the Terraform® configuration file, the IaC configuration file a combination thereof, and the like, define the desired state of a cloud computing environment that is to be deployed. In an embodiment, the Terraform® configuration file, the IaC configuration file a combination thereof, and the like, define resources that are to be deployed in the cloud computing environment.

In some embodiments, the IaC configuration file (e.g. Terraform® configuration file) includes data on what types of resources should be deployed in the cloud computing environment including the function of each resource, the location of each resource within the cloud computing environment, a combination thereof, and the like.

In various embodiments, the codifier (FIG. 1, 150) is configured to send the generated declaration code located in the IaC configuration file (e.g. Terraform® configuration file) to the code repository (FIG. 1, 160) which stores the file. In some embodiments, the codifier is configured to provide access to an IaC platform to the declaration code.

At S530, a plurality of resources are deployed. In an embodiment, a plurality of resources are deployed wherein each resource is deployed based on a code object of the declaration code.

In some embodiments, the code objects that are integrated into the declaration code of the IaC configuration file (e.g. Terraform® configuration file) identify resources that should be deployed in a cloud computing environment. In certain embodiments, the code objects provide data that define resources, resource types, resource functions, resource locations in the cloud computing environment, a combination thereof, and the like. In various embodiments, the codifier (FIG. 1, 150) is configured to trigger the deployment of a resource, a plurality of resources, and the like, in a second cloud computing environment (FIG. 1, 180).

In an embodiment, the codifier (FIG. 1, 150) is configured to trigger the deployment of a duplicate resource (FIG. 1, 195) in the second cloud computing environment (FIG. 1, 180). In certain embodiments, a duplicate resource (FIG. 1, 195) is deployed in the second cloud computing environment (FIG. 1, 180) and includes an identical configuration to a first resource located in the first cloud computing environment (FIG. 1, 110).

In an embodiment, the duplicate resource (FIG. 1, 195) includes an identical resource type, function, deployment location, combination thereof, and the like, of a resource in the first cloud computing environment (FIG. 1, 110). In an embodiment, the codifier (FIG. 1, 150), an IaC platform, and the like, is configured to send a request to an orchestrator (FIG. 1, 190) to provision the deployed resources. In various embodiments, the orchestrator (FIG. 1, 190) is configured to provision the deployed resources (e.g. duplicate resource FIG. 1,195) in the second cloud computing environment (FIG. 1, 180).

According to an embodiment, the codifier is configured to trigger the deployment of a resource in a second cloud computing environment by providing the declaration code to an IaC platform, and initiating a computer instruction (for example through an API) which causes the IaC platform to deploy a resource in a second cloud computing environment based on the declaration code.

Figure 6:
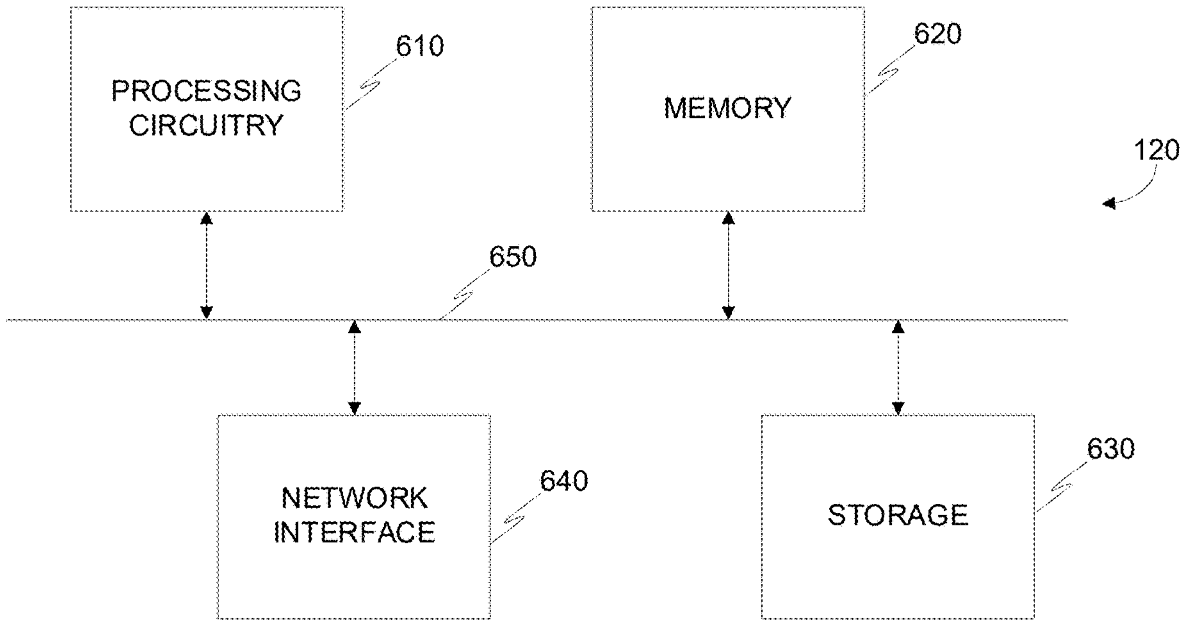
FIG. 6 is an example schematic diagram of a codifier according to an embodiment.

FIG. 6 is an example schematic diagram of a codifier 150 according to an embodiment. The codifier 150 includes a processing circuitry 650 coupled to a memory 620, a storage 630, and a network interface 640. In an embodiment, the components of the codifier 150 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., a read-only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the codifier 150 to communicate with, for example, the API 140, the IaC 170, resources in the cloud computing environments, the code repository 160, and the like.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for cloud migration including deploying a plurality of resources in a cloud computing environment, comprising:
- accessing a plurality of code objects located in a code repository;
- generating a declaration code for an Infrastructure as Code (IaC) platform based on code objects, wherein the code objects are integrated into the declaration code and located in a IaC configuration file; and
- initiating network discovery to detect a plurality of resources in a cloud computing environment wherein each resource is deployed in the cloud computing environment based on the code objects of the declaration code located in the IaC configuration file.

2. The method of claim 1, further comprising:
- accessing a primary cloud computing environment to detect resources deployed therein;
- extracting configuration data from each resource;
- generating a code object of the plurality of code objects based on the extracted configuration data; and
- generating a declaration code based at least on the generated code object.

3. The method of claim 2, further comprising:
- detecting the plurality of resources in the cloud computing environment; and
- generating an instruction to deprovision a corresponding resource in the primary cloud computing environment.

4. The method of claim 1, further comprising:
- sending a request to provision deployed resources in cloud computing environment to an orchestrator, wherein the orchestrator is configured to provision the deployed resources in a cloud computing environment.

5. The method of claim 1, further comprising:
- generating a deployment plan of a plurality of resources in the cloud computing environment including a single or a plurality of duplicate resources, wherein the duplicate resource is identical in any one of: configuration, function, type, location, and any combination thereof, to another resource in another cloud computing environment.

6. The method of claim 1, further comprising:
- sending the generated declaration code integrated with the code objects to a code repository.

7. The method of claim 1, further comprising:
- generating in a first code object an identifier of a specific resource to be deployed in a cloud computing environment.

8. The method of claim 1, further comprising:
- defining the code objects to include any one of: a type of resource, a configuration of a resource, a function of a resource, a location of a resource, and any combination thereof.

9. A non-transitory computer-readable medium storing a set of instructions for cloud migration including deploying a plurality of resources in a cloud computing environment, the set of instructions comprising:
- one or more instructions that, when executed by one or more processors of a device, cause the device to:
  - access a plurality of code objects located in a code repository;
  - generate a declaration code for an Infrastructure as Code (IaC) platform based on code objects, wherein the code objects are integrated into the declaration code and located in a IaC configuration file; and
  - initiate network discovery to detect a plurality of resources in a cloud computing environment wherein each resource is deployed in the cloud computing environment based on the code objects of the declaration code located in the IaC configuration file.

10. A system for cloud migration including deploying a plurality of resources in a cloud computing environment comprising:
- one or more processors configured to:
- access a plurality of code objects located in a code repository;
- generate a declaration code for an Infrastructure as Code (IaC) platform based on code objects, wherein the code objects are integrated into the declaration code and located in a IaC configuration file; and
- initiate network discovery to detect a plurality of resources in a cloud computing environment wherein each resource is deployed in the cloud computing environment based on the code objects of the declaration code located in the IaC configuration file.

11. The system of claim 10, wherein the one or more processors are further configured to:

access a primary cloud computing environment to detect resources deployed therein;

extract configuration data from each resource;

generate a code object of the plurality of code objects based on the extracted configuration data; and generate a declaration code based at least on the generated code object.

12. The system of claim 11, wherein the one or more processors are further configured to:

detect the plurality of resources in the cloud computing environment; and generate an instruction to deprovision a corresponding resource in the primary cloud computing environment.

13. The system of claim 10, wherein the one or more processors are further configured to:

send a request to provision deployed resources in a cloud computing environment to an orchestrator, wherein the orchestrator is configured to provision the deployed resources in a cloud computing environment.

14. The system of claim 10, wherein the one or more processors are further configured to:

generate a deployment plan of a plurality of resources in the cloud computing environment including a single or a plurality of duplicate resources, wherein the duplicate resource is identical in any one of:

configuration, function, type, location, and any combination thereof, to another resource in another cloud computing environment.

15. The system of claim 10, wherein the one or more processors are further configured to:

send the generated declaration code integrated with the code objects to a code repository.

16. The system of claim 10, wherein the one or more processors are further configured to:

generate in a first code object an identifier of a specific resource to be deployed in a cloud computing environment.

17. The system of claim 10, wherein the one or more processors are further configured to:

define the code objects to include any one of:

a type of resource, a configuration of a resource, a function of a resource, a location of a resource, and any combination thereof.

* * * * *